Sept. 9, 1969
C. R. ADAMS
3,465,644
VERTICAL MOTION POSITIONING SYSTEM
Filed March 9, 1966
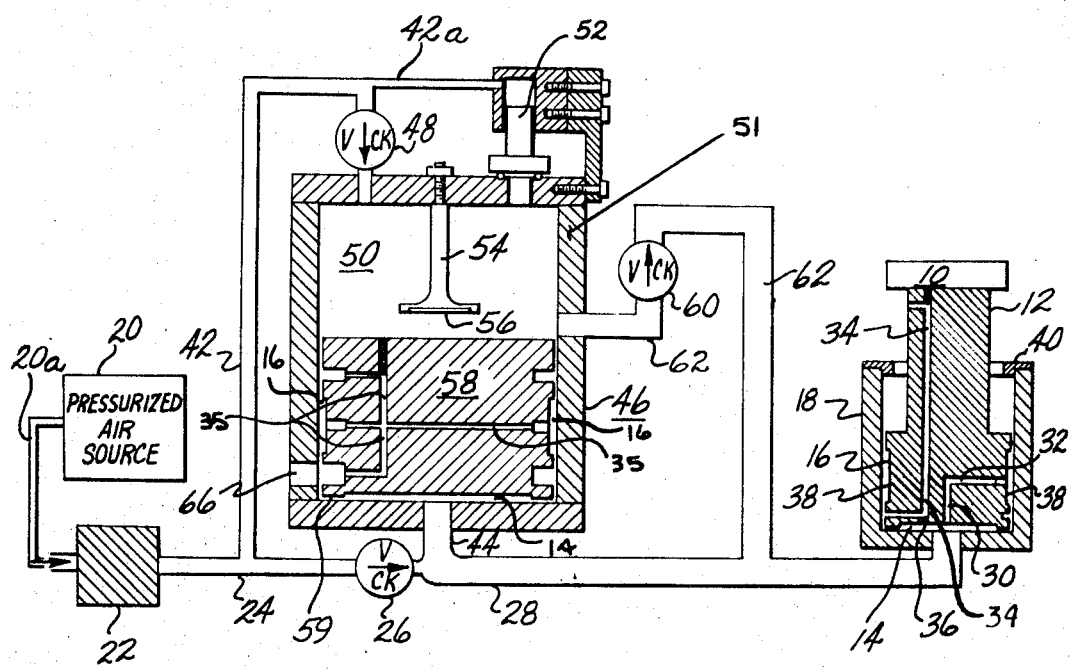
INVENTOR.
CLARENCE R. ADAMS
BY
ATTORNEY

3,465,644
VERTICAL MOTION POSITIONING SYSTEM
Clarence R. Adams, Kirkland, Wash., assignor to The Boeing Company, Seattle, Wash., a corporation of Delaware
Filed Mar. 9, 1966, Ser. No. 533,029
Int. Cl. F15b 13/06
U.S. Cl. 91—49   3 Claims

ABSTRACT OF THE DISCLOSURE

A fluid balanced vertical motion positioning system for supporting an object which cmprises a fast response fluid pressure regulating means which cooperates with conventional regulating means, valves, and interconnecting fluid lines, in a manner such as to maintain continuously constant fluid pressure in a pressure chamber under the object to be supported, thereby maintaining said object precisely at a given elevation after the object has been moved to said elevation by application of an outside force. The fast response regulating means includes a cylinder and a piston which divides said cylinder into two chambers. Each of said two chambers is connected by fluid supply lines to a supply line leading to said pressure chamber under said object.

---

This invention relates to a gravity-free environment simulator or support system which is designed to support a mass in such a manner that the mass is free to react in a single plane (e.g., up or down) substantially free of any resisting friction force, and within the mechanical limits of the apparatus.

More particularly, this invention comprises a pneumatic system for accomplishing the result outlined above, the system including a load support piston which is itself "floated" by air pressure, and including a rapid response pressure regulator for minimizing forces of the piston when outside forces are applied thereto. Additionally, the pneumatic system includes pneumatic hydrostatic or fluid bearings, often referred to as "air bearings" wherein a movable body is supported by a fluid under high pressure. The particular pneumatic hydrostatic or fluid bearings are in accordance with my United States Patents No. 3,112,-140, entitled "Fluid Bearings" and No. 3,101,224, entitled "High Load Hydrostatic Bearing."

The instant invention makes it possible to balance the weight of an object pneumatically so that either an upward or a downward force upon the object will cause said object to travel in the direction of the force, e.g., downward, at a rate proportional to the force until the mechanical limits of this system are reached, or until a different, e.g., upward, force is applied.

Heretofore, pneumatic balancing of a weight was limited by friction in the apparatus in combination with the characteristic slow response of conventional pressure regulators. As noted above, the instant invention uses air or gas bearings made according to my Patents Nos. 3,101,224 and 3,112,140 to eliminate frictional drag for all practical purposes. A fast response pressure regulator, also embodying air or fluid bearings, which is fed from a conventional pneumatic pressure regulator, is used to maintain the required balance pressure at all times.

The instant invention finds use in balancing extremely sensitive precision inspection probes. It also can be used to provide vertical motion balance on space vehicle operating simulators. It could be used in any device where it is desirable to minimize the effects of gravity on vertical motion. For example, in milling to a workpiece. By application of the teachings of this invention a mill operator can conveniently position the cutting tool manually without need for levers and set screws to sustain the tool position once it is acquired.

An object of this invention is to provide means in apparatus for balancing the weight of an object pneumatically.

A further object of this invention is to provide a pneumatic balance apparatus which operates with a minimum of friction drag and with a fast response.

Another object of the instant invention is to provide apparatus for balancing extremely sensitive precision inspection probes.

Another object of the instant invention is to provide apparatus to minimize effects of gravity on a vertical motion system.

Other objects and various advantages of the disclosed invention will be apparent from the following detailed description, together with the accompanying drawings, submitted for purposes of illustration only and not intended to define the scope of the invention, reference being had for that purpose to the subjoined claims. The drawing diagrammatically illustrates by way of example, not by way of limitation, one form of the invention.

The figure is a cross-sectional view of an embodiment of this invention wherein like components are designated by like reference symbols.

The invention disclosed herein is not limited in its application to the method and details of construction and arrangement of parts shown and described, since the invention is capable of other embodiments and of being practiced or carried out in various other ways. Also, it is to be understood that the phraseology or terminology employed herein is for the purpose of description and not of limitation.

Referring to the right-hand side of FIGURE 1, an object of mass 10 is shown which is to be balanced and positioned in a substantially vertical direction. The object 10 is attached to or supported by an air or fluid bearing positioning piston 12 formed of metal and having a vertical axis as shown. In the manner described in my U.S. Patent No. 3,112,140, shallow thrust recess area 14 and radical thrust recess area 16 provide air or fluid bearings which eliminate frictional contact between the piston 12 and metal piston cylinder 18. Fluid under pressure from a source 20 is fed by means of conduit 20a through a conventional pressure regulator 22, and conduit means including: supply line 24, check valve 26 and supply line 28 into cylinder 18 where it pressurizes the thrust recess area 14, and the radial thrust recess 16 by passing through passages 30 and 32 in the piston 12. A bleed groove and passageway 34 within piston 12 relieves the pressure between the radial bearing surface 38 and its opposing internal wall of cylinder 18 and thrust bearing surface 36 and its opposing internal wall of cylinder 18 so that the piston 12 will float freely. When the regulated pressure exceeds the combined weight of object 10 and piston 12, piston 12 will lift until it reaches piston 12 metallic stops 40 or until the pressure is reduced to a value required to balance the load (viz., the weight of object 10 and piston 12). This balance pressure is desired and is determined in accordance with the weight of object 10 and piston 12 by setting pressure regulator 22.

Air or fluid from the regulator 22 is fed, in response to movement of piston 12 as discussed below, through conduit means 42 and 44 into a fast response regulator 46 which comprises metal cylinder 51 and metal piston 58 also having a vertical axis. The regulator 46 utilizes air bearings, thrust 14 and radial 16 as discussed above, in accordance with my U.S. Patent No. 3,112,140, to eliminate friction, and essentially comprises a cylinder 51 of piston 58 in combination with the piston 12 cylinder 18 arrangement. A bleed groove 35 within piston 58 functions as does bleed groove 34 in piston 12 above. A check valve 48 located at the top (as shown) of the cylinder 51 permits flow into a regulator chamber 50 of cylinder 51 but does not permit flow out of the chamber 50; i.e., when the pressure of the fluid within chamber 50 exceeds the pressure of the fluid in conduit 42, check valve 48 prevents fluid from passing from chamber 50 in conduit 42. However, when the pressure within chamber 50 drops below the pressure maintained in conduit 42 by regulator 22, fluid will flow into chamber 50 from conduit 42 across valve 48. A large pressure relief valve 52, also located attached to the top (as shown) of cylinder 51, permits pressure to be relieved rapidly in chamber 50 whenever the pressure in chamber 50 exceeds the fluid pressure in conduit 42 and 42a determined by conventional pressure regulator 22. It is apparent that the pressure in conduit 42a, developed by regulator 22, maintains valve 52 in its closed position (as shown) until the pressure in chamber 50 does exceed the pressure in conduit 42 and 42a.

A piston 58 metal stop 54, having a vertical axis, utilizes a shallow recess (.002–.0020 inch) thrust surface 56 to develop a film to cushion piston 58 when the piston 58 comes up against the stop 54 during operation of this invention.

In operation, when an external force from some source (not shown, but, for example, manual lifting of object 10) causes the object 10 and piston 12 to translate upwards (toward the top of the drawing as shown), the conventional pressure regulator 22 will be unable to supply a sufficient volume of fluid, in a short period of time, to the supply line 28 to maintain balancing pressure adequate to support the weight of object 10 and piston 12 in the exact position at which the object 10 reaches when the external force is no longer applied. More specifically, as object 10 and piston 12 translate upwards, the pressure of the fluid supporting object 10 and piston 12 is reduced (i.e., the volume enclosed between thrust bearing surface 36 and its opposing internal wall of cylinder 18 increases) thus inducing flow of fluid from conduit 24 across valve 26, through conduit 28 and into cylinder 18. At the same time, as seen above, the pressure of fluid within cylinder 51 of fast response regulator 46 is equal to the pressure of fluid within conduits 24 and 42 as maintained by regulator 22. As the fluid pressure within cylinder 18 supporting object 10 and piston 12 decreases, the fluid pressure also decreases in conduit 62. Thus, fluid from chamber 50 flows through conduit 62 across valve 60 and through conduit 62 and into cylinder 18. This fluid from regulator 46, coupled with fluid from regulator 22, quickly raises the pressure within cylinder 18 so that piston 12 and object 10 are supported when the lifting force is removed.

When an external force causes object 10 and piston 12 to translate rapidly downward (e.g., from a top position against stops 40 to the position as shown), the fluid in cylinder 18 is compressed and pressure in lines 28, 44 and 62 increases, causing check valves 26 and 60 to close and regulator piston 58 to rise. As piston 58 rises, it compresses the fluid in chamber 50 so that check valve 48 closes and the pressure relief valve 52 opens until chamber 50 pressure is equal to the balancing pressure from regulator 22. As piston 58 rises, the support pressure leakage path around the lower land surface 59 on the piston 58 is reduced and pressure is relieved at an increasing rate until the piston 58 has come up against the stop 54 and a vent port 66 is completely open to the underside surface 59 of the piston 58. By using fluid bearing pistons having large relief and supply ports, in accordance with the teachings of this invention, it is possible to maintain an almost constant balance pressure so that object 10 is continually positioned as if it were suspended in a zero gravity condition. That is, when the downward external force upon object 10 is removed, the object 10 and piston 12 remain in the position they were at the time the external force was removed, supported by a cushion of fluid in cylinder 18. Again, if an upward force be exerted upon object 10, pressure within cylinder 18 and conduits 28 and 44 will decrease; fluid will flow across valve 26 as before, the piston 58 will translate downward under its own weight from stop 54, forcing additional fluid into conduit 28 through conduit 44. This fluid will flow into cylinder 18. Since piston 12 has more translatable distance within cylinder 18 than does piston 58 within cylinder 51, if still more fluid is needed within cylinder 18 to support objects 10 and piston 12, valve 60 will open and allow fluid to pass from chamber 50 into conduit 62 as discussed above.

I claim:
1. An apparatus for supporting and positioning an object comprising:
 a pressurized fluid source,
 fluid responsive means for supporting and positioning said object,
 first fluid pressure regulating means,
 fast response fluid pressure regulating means comprising:
  a cylinder and a piston,
  said piston arranged for longitudinal travel within said cylinder and dividing said cylinder into first and second chambers,
 first conducting means for conducting fluid from said first fluid pressure regulating means to said first and second chambers,
 means for restricting return flow from said first chamber to said first fluid pressure regulating means,
 second conducting means for conducting fluid from said first and second chambers to said fluid responsive means,
 means for restricting return flow of said fluid from said fluid responsive means to said second chamber,
 wherein said fast responsive fluid pressure regulating means cooperates with said first fluid pressure regulating means to maintain a constant pressure in said fluid responsive means for supporting said object, irrespective of the instant position of said object.

2. The apparatus of claim 1 including means operably responsive to the position of said piston for venting said first chamber to atmosphere, means operably responsive to pressure variation in said second chamber for venting said second chamber to atmosphere, and means for restricting return flow from said second chamber to said first fluid pressure regulating means.

3. The apparatus of claim 1 wherein said fluid responsive means for supporting said object comprises an object support piston mounted for longitudinal travel on fluid bearings within a support cylinder and wherein said fast response fluid pressure regulating means comprises fluid bearing means for supporting the piston of said regulating means.

References Cited

UNITED STATES PATENTS

| | | | |
|---|---|---|---|
| 2,721,446 | 10/1955 | Bumb | 60—51 |
| 2,813,519 | 11/1959 | Persson | 91—49 |
| 3,060,895 | 10/1962 | Acker | 91—422 |
| 3,101,224 | 8/1963 | Adams | 308—122 |
| 3,257,912 | 6/1966 | Horst | 91—49 |
| 3,260,164 | 7/1966 | Guentner | 60—57 |

EVERETTE A. POWELL, Primary Examiner